(12) United States Patent
Burd et al.

(10) Patent No.: US 8,143,819 B2
(45) Date of Patent: Mar. 27, 2012

(54) OPTIMIZED POWER DEMAND CONTROL SYSTEM FOR ELECTRICAL MOTORS

(76) Inventors: Alexander L. Burd, Suffield, CT (US); Galina S. Burd, Suffield, CT (US)

( * ) Notice: Subject to any disclaimer, the term of this patent is extended or adjusted under 35 U.S.C. 154(b) by 203 days.

(21) Appl. No.: 12/661,764

(22) Filed: Mar. 24, 2010

(65) Prior Publication Data
US 2011/0234124 A1 Sep. 29, 2011

(51) Int. Cl.
*H02P 1/26* (2006.01)
(52) U.S. Cl. .................................. 318/268; 318/438
(58) Field of Classification Search ............... 318/438
See application file for complete search history.

(56) References Cited

U.S. PATENT DOCUMENTS

| 6,166,514 A * | 12/2000 | Ando et al. ............ 318/811 |
| 2001/0017235 A1 * | 8/2001 | Suga et al. ............ 187/290 |
| 2002/0053490 A1 * | 5/2002 | Banno et al. .......... 187/290 |
| 2007/0200528 A1 * | 8/2007 | Itou et al. ............. 318/719 |

* cited by examiner

*Primary Examiner* — Mark Budd

(57) ABSTRACT

An energy conservation system that realizes optimized power demand control for alternating current electrical motors equipped with variable frequency drives is implemented by switching an electrical motor via bypass systems from a variable frequency and speed drive mode of operation to a constant frequency and speed drive mode of operation and from a constant frequency and speed drive mode of operation to a variable frequency and speed drive mode of operation. The switching from one mode of operation to another is automatically executed based on the comparative analysis of historical and current trends of the electrical motor actual power demand at variable and constant speed drive modes of operation at various loads. The system optimizes the electrical motor operation by selecting the mode with the lower magnitude of cumulative power demand for the motor and motor drive at a given motor load.

8 Claims, 1 Drawing Sheet

OPTIMIZED POWER DEMAND CONTROL SYSTEM FOR ELECTRICAL MOTORS

CONTROL SYSTEM SCHEMATICAL REPRESENTATION DIAGRAM

OPTIMIZED POWER DEMAND CONTROL SYSTEM FOR ELECTRICAL MOTORS
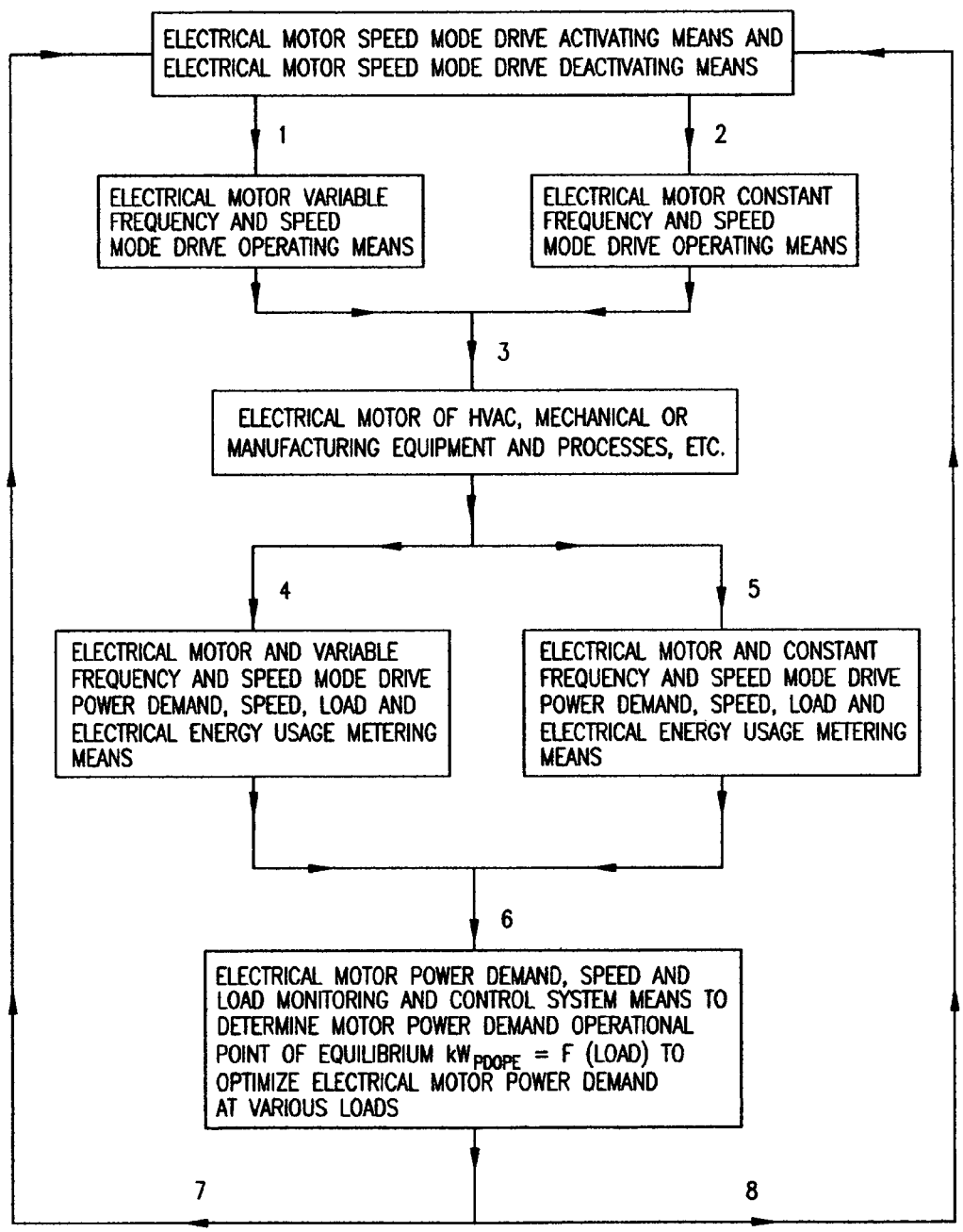
CONTROL SYSTEM SCHEMATICAL REPRESENTATION DIAGRAM

OPTIMIZED POWER DEMAND CONTROL SYSTEM FOR ELECTRICAL MOTORS

BRIEF SUMMARY OF THE INVENTION

An energy conservation system that realizes optimized power demand control for alternating current electrical motors equipped with variable frequency drives is implemented by switching an electrical motor via bypass systems from a variable frequency and speed drive mode of operation to a constant frequency and speed drive mode of operation and from a constant frequency and speed drive mode of operation to a variable frequency and speed drive mode of operation. The switching from one mode of operation to another is automatically executed based on the comparative analysis of historical and current trends of the electrical motor actual power demand at variable and constant speed drive modes of operation at various loads. The system optimizes the electrical motor operation by selecting the mode with the lower magnitude of cumulative power demand for the motor and motor drive at a given motor load.

BACKGROUND OF INVENTION

The invention is related to the optimization of power demand control in the systems employing alternating current electrical motors with variable frequency drives (VFDs) serving HVAC and mechanical system pumps, fans, chillers, cooling towers, boilers, air compressors and various manufacturing machines, equipment and processes. During many years VFDs have been widely used to control multiple processes served by electrical motors. VFDs extensive applications have increased ever so more recently due to the strong emphasis on energy conservation. When the electrical motors are running via variable frequency drive control mode at the reduced as compared to the design conditions the motors voltage, operational speeds, power demand and electrical energy consumption are also reduced. However, when a VFD is running the motor at or near its design load then the system power demand and electrical energy consumption is increased as compared to the constant frequency and speed mode due to the inefficiency imposed by the VFD operation. The invention develops the system and control strategy method to switch the VFDs to the bypass operation with constant motor speed and frequency at the constant power line voltage when the motor has to be running at or near 100% of the VFD speed and to switch it back to the VFD control mode when the speed of the motor has to be below 100%. The motor load control when the motor is operating at the constant frequency and speed drive mode is accomplished via variable line amperes draw utilized by the motors to satisfy the load. This reduces motor power demand at the reduced loads. VFD efficiency is typically varies from 94% to 97% for the range of the motor's operational speeds of 30% to 100%. The combined efficiency of the electrical motor operation that is equipped with a VFD control assuming all other factors to be equal could be determined as a result of multiplication of the electrical motor and VFD efficiencies.

The inefficiency imposed by the VFD operations during the most time is compensated with the electrical energy savings due to the reduced speed of the electrical motor. However, when the electrical motor speed is approaching its design magnitude the power demand and energy usage for the equipment with VFD control exceeds their magnitudes for the electrical motors without VFD control when the electrical motor is operating at approximately constant speed. Usually, the electrical motor without VFD control that is running at its design 100% speed will require power demand by about 2.5% to 3% lower than one with VFD control that is also running at 100% speed.

These potential savings are based on the advertised by VFD manufacturers efficiencies for the variable frequency drives at 100%. The actual power demand reduction for the motor at its design speed operating conditions with constant frequency drive mode without VFD control due to a number of factors (i.e., the electrical motors operating at a higher than design loads conditions in the zone of their service factor, deteriorating over time operational efficiency of the VFD drives, etc.) may exceed the shown above magnitudes.

In some current applications VFDs employ a bypass to switch from variable to constant speed mode in case of the VFD failure. However, this provision is done only to improve reliability of motor operation and does not allow to reduce motor power demand or to save energy.

DETAILED DESCRIPTION OF THE INVENTION

The suggested strategically arranged switching from VFD to constant speed mode will allow reducing the power demand and electrical energy consumption of the electrical motor with optimized bypass mode of operation serving the equipment running at or near the design capacity. The optimal switching from VFD to constant frequency and speed mode of operation and vice versa could be accomplished by continual monitoring and metering of the power demand and load for the electrical motor in both VFD and constant speed modes. This will generate the electrical motor historical power demand magnitudes as a function of the motor load or kW=F (Load). The switching from the VFD to constant speed mode of operation and vice versa could then be accomplished via a comparison of the motor's present and historical trends of power demand readings at the various loads carried by the motors serving various equipment and processes (i.e., kW for motor and VFD as opposed for kW for motor only in a VFD bypass mode). At some reference point of the motor load-motor power demand operational point of equilibrium—represented by the equation $kW_{PDOPE}=F(Load)$ the cumulative power demand consisting of power demand for the motor and VFD for the electrical motor operating at variable speed mode will become equal to the power demand of the electrical motor operating at constant speed mode. This reference point represents the motor power demand operational point of equilibrium when the motor power demands for the same load are equal for operations with variable and constant speed modes.

The finding of the reference point of the motor load could be accomplished based on the functional analysis of the actual electrical motor power demands at variable and constant speed operations depending on the motor loads. This analysis is representative of the two functions:

1. kW (VFD+Motor)=F (Load);
2. kW (Motor)=F (Load).

The first function represents the motor power demand at variable frequency and speed mode depending on the motor load. The second function represents the motor power demand at constant frequency and speed mode depending on the motor load. The earlier shown equation of $kW_{PDOPE}=F$ (Load) represents a resultant equation that is derived from combined resolution of the first and the second functions. The motor load could be represented by multiple directly or indirectly metered parameters. The actual load of the motor (motor torque) can be determined directly based on the outlined above analysis considering the actual motor HP and actual or projected speed of the motor operation. The projected speed of the motor operation for variable speed mode can be determined from the data available from the monitored by VFD motor speed during variable speed mode. The projected speed for the motor operation for the constant speed mode can be assumed constant based on the data from the motor manufacturer. The actual speed of the motor for the constant and variable speed modes can be directly read if a tachometer is installed on the motor. The load of the motor can be also determined indirectly from the served by the motor and monitored process parameters, for example, water flow rates and supply and return water temperature differential for heating and cooling and by calculating heating and cooling loads, respectively, based on the listed above parameters. The equipment load served by the electrical motors can be also determined based on the equipment load indicating means, etc.

It must be noted that the magnitude of power demand savings for the electrical motor for the suggested control strategy may depend on the system operational factors such as a parametric structure of the pressure drop in the system. For example, for the hydraulic system that experiences most of the pressure drops as a function of friction losses in pipes the power demand in the system with VFD is reduced as the ratio of the current flow rate over the design flow in power of 3. However, for the hydraulic systems with substantial pressure drop due to the static lift of the liquid the reduction in power demand for the electrical motors with VFD while the motor speed is reduced might be lower than that of power 3. This will lead to the shifting of the motor power demand operational point of equilibrium and change both the potential power demand and electrical energy savings. On the other hand, the pump load profile as well as the size of the motor HP compared to the actual load could also substantially impact the electrical motor power demand and potential electrical energy savings.

As soon as cumulative kW power demand of the electrical motor and VFD at its current operation at variable speed mode becomes higher than the power demand of the motor operational point of equilibrium the motor variable speed operational mode should be changed to the VFD bypass mode that relates to the motor running at constant frequency and speed. On the other hand, if the cumulative kW power demand of the motor and VFD at its current operation at variable speed mode remains equal or lower than the power demand of the motor operational point of equilibrium then the motor variable speed operational mode should be continued.

As soon as motor kW power demand at its current operation at constant speed mode becomes lower than the power demand of the operational point of equilibrium the motor constant frequency and speed operational mode should be changed to the VFD mode (constant frequency and speed bypass mode) that relates to the motor running at variable speed. On the other hand, if the kW power demand of the motor at its current operation at constant frequency and speed mode remains equal or higher than the power demand of the motor operational point of equilibrium then the motor constant speed operational mode should be continued.

The suggested system of power demand control is equally applicable for the electrical motors with the stand alone VFD monitoring and control systems as well as for ones with centralized building monitoring and control systems. The suggested system can be also utilized to activate the optimized control of power demand in a facility directly from the centralized electrical utilities power grid monitoring and control system.

The design electrical power demand (maximum cumulative kW magnitude for the system) is a very important factor for the electrical utilities that have to size their generating equipment capacities to satisfy maximum power demand at design conditions of a particular system. This is why the reduction of the power demand in the system during its design conditions is critical to maintain the electrical utility system fully operational at the most power demanding conditions. This might require the application of power demand shedding strategy when the electrical utility asks the customers to reduce their power demand during the electrical system maximum power demand loads. The application of the power demand shedding strategy requires that the customer's electrical equipment has to run temporarily at the reduced capacity. This might lead to the interruption of the normal production cycle for the manufacturing facilities, to negative impact to environmental parameters in the area, etc.

Suggested potential means of reduction in electrical power demand at or near design loads might lead to the ability of the facility's to implement power demand shedding at the most critical time when the facility is experiencing maximum power demand without interrupting (or with a reduced interruption level) a manufacturing process or negatively impacting the environmental parameters in the area, etc.

A computerized control can be engaged via a stand alone or building automation system to monitor and register an actual motor power demand at various magnitudes of motor speeds of the VFD. Thus, the trend data of the motor kW power demand can be created for VFD mode operation (motor constant frequency and speed drive bypass mode) with different speeds and various loads.

The similar trend data can be created for the motor operations with constant frequency and speed mode (motor VFD drive bypass mode) with about 100% speed. This will allow having an array of motor kW power demand values at various loads while the motor speed is maintained close to 100% and the motor controlled in the VFD bypass mode.

The comparative data analysis for kW power demands for the electrical motor operations with variable and constant mode speed for various loads will allow to select the optimal motor speed operational mode to minimize the motor's power demand.

The time of electrical motor switching from VFD to VFD bypass mode of operation and from constant frequency and speed mode to VFD (constant frequency and speed bypass mode) is critical and should never exceed the allocated by an electrical utility "power demand window" (i.e., 15 minutes, 30 minutes, etc.) by which the utility is typically charging customers for power demand.

For the stand alone system with power demand monitoring and control the switching from the VFD to VFD bypass mode and from constant frequency and speed mode to VFD could be accomplished based on the described above conditions for a single electrical motor. For the system with a centralized building automation system and power demand monitoring and control a more sophisticated control strategy could be realized. This control that considers power demand profile and the operating diversity factor of multiple electrical energy users in the facility could better account for the time when power demand shedding is necessary.

The utilization of the suggested control strategy and gathering operating trend data for the motors would also allow to optimize a size of the electrical motors to better match the motor actual load for a particular application and to increase or reduce the installed motor HP, if necessary, based on the actual operating speeds at various loads. This will further reduce electrical motor power demand because of the better control flexibility to operate the electrical motor either in variable frequency drive mode or variable frequency bypass mode with constant frequency drive to maintain optimal electrical power demand and electrical energy usage.

The computerized parametric analysis of the motor's operating data will allow to establish the most advantageous switching order for the various electrical motors from one operational mode to another based on the projected magnitude in potential power demand and electrical energy usage reduction. The electrical motors with higher potential magnitudes of kW and kWh reduction will have the first priority for mode switching order.

Similarly to the above the electrical utilities may have their own power demand control strategy to apply power demand shedding based on the entire system power demand profile that incorporates the overall system power demand diversity factor. From this point of view either the earlier or later switching from VFD mode to the VFD bypass mode or from the constant frequency and speed mode to the VFD mode (constant frequency and speed bypass mode) at the considered facility or building could be realized as well.

The ability to reduce electrical motor power demand at design conditions that can be materialized by the application of the suggested system might be very important for electrical utilities. This reduced power demand could allow electrical utilities to defer a costly installation of the power generation system that, otherwise, could be necessary to satisfy the electrical load.

BRIEF DESCRIPTION OF THE DRAWINGS

FIG. 1 shows the Control System Schematical Representation Diagram for Optimized Power Demand Control System for Electrical Motors.

The Control System Schematical Representation Diagram for Optimized Power Demand Control for Electrical Motors is shown in FIG. 1. In FIG. 1, reference numerals denote as follows:

1—bypass means to activate or deactivate operating of electrical motor variable frequency and speed mode drive;
2—bypass means to activate or deactivate operating of electrical motor constant frequency and speed mode drive;
3—means to convey operating commands from electrical motor variable or constant frequency and speed mode drives to electrical motor to run the electrical motor in variable or constant speed modes;
4—means to convey the electrical motor and variable frequency and speed drive operational data information to metering means;
5—means to convey the electrical motor and constant frequency and speed drive operational data information to metering means;
6—means to convey the metered data for electrical motor with variable and constant frequency and speed modes from the metering means to electrical motor power demand, load and speed monitoring and control system means to optimize electrical motor power demand at various loads;
7—means to convey the resultant control command from electrical motor power demand, load and speed monitoring and control system to electrical motor speed mode drive activating and deactivating means to operate electrical motor in variable frequency and speed mode drive;
8—means to convey the resultant control command from electrical motor power demand, load and speed monitoring and control system to electrical motor speed mode drive activating and deactivating means to operate electrical motor in constant frequency and speed mode drive.

The speed mode drive activating and deactivating means receive the resultant control command 7 from the electrical motor power demand, speed and load monitoring and control system to activate variable frequency and speed mode drive. The electrical motor speed mode drive activating means upon receiving the resultant control command 7 from the electrical motor power demand, speed and load monitoring and control system to activate electrical motor variable frequency and speed mode drive operation acts consequently via bypass means 1 to activate electrical motor variable frequency and speed mode drive operating means. The electrical motor speed mode drive deactivating means upon and simultaneously with the activation of the variable speed mode drive of the electrical motor acts consequently via bypass means 2 to deactivate constant frequency and speed mode drive operating means of the electrical motor in such a way that the electrical motor can only operate in variable frequency and speed mode of operation at the particular time. Under this scenario the electrical motor of HVAC, mechanical or manufacturing equipment and processes, etc. via means 3 that convey operating commands from variable frequency and speed mode drive to electrical motor will be controlled via variable frequency drive only.

In a different operational situation the electrical motor speed mode drive activating and deactivating means receive the resultant control command 8 from the electrical motor power demand, speed and load monitoring and control system to activate constant frequency and speed mode drive operating means. The electrical motor speed mode drive activating means upon receiving the resultant control command 8 from the electrical motor power demand, speed and load monitoring and control system to activate constant frequency and speed mode drive operation acts consequently via bypass means 2 to activate constant frequency and speed mode drive operating means. The electrical motor speed mode drive deactivating means upon and simultaneously with the activation of the constant speed mode drive of the electrical motor acts consequently via bypass means 1 to deactivate variable frequency and speed mode drive operating means of the electrical motor in such a way that the electrical motor can only operate in constant frequency and speed mode of operation at the particular time. Under this scenario the electrical motor of HVAC, mechanical or manufacturing equipment and processes, etc. via means 3 that convey operating command from constant frequency and speed mode drive to electrical motor will be controlled via constant frequency drive only.

The electrical motor operational data from the variable or constant frequency drive mode is then sent via means 4 or 5, respectively, which convey the operational data to electrical motor power demand, speed, load and electrical energy usage metering means. The metered data is then via means 6 transferred to the electrical motor power demand, speed and load monitoring and control system that include means to optimize electrical motor power demand at various loads. The gathered operating data is then processed in the monitoring and control system via means to optimize electrical motor power demand at various loads for variable and constant speed modes. These means compare the actual electrical motor power demand magnitudes for variable and constant frequency and speed modes at the various loads and determine the power demand operational point of equilibrium for the conditions of the equal load at which power demand values for the electrical motor with variable and constant frequency and speed modes are equal. The monitoring and control system based on this information determines the optimal mode of operation for the electrical motor at the particular time when the electrical motor power demand is lower or higher than or equal to the power demand operational point of equilibrium.

The electrical motor power demand, speed and load monitoring and control system will always run the motor in variable frequency and speed mode upon the first event when the electrical motor is being turned on. The electrical motor power demand, speed and load monitoring and control system upon the motor first time reaching a predetermined speed after the motor is being turned on and while it is running in the variable speed mode will always switch the motor from variable frequency and speed mode to constant frequency and speed mode. After this the automatic switch between variable and constant frequency and speed modes will be realized via described earlier strategy. Upon any interruption of the system normal operation the electrical motor power demand, speed and load monitoring and control system will restart electrical motor operation in variable frequency and speed drive mode.

The electrical motor power demand, speed and load monitoring and control systems upon the completion of the motor's operating data analysis at variable and constant frequency and speed modes and optimization of the electrical motor power demand at various loads will send the resultant control commands 7 or 8 to the electrical motor speed mode drive activating and speed mode drive deactivating means to run the electrical motor either in variable or constant frequency and speed mode drive operation. In case of a failure of the variable frequency and speed drive the electrical motor has means to be automatically or manually switched to constant frequency and speed drive mode operation. In case of a failure of the constant frequency and speed drive the electrical motor has means to be automatically or manually switched to variable frequency and speed drive mode operation.

The electrical motor power demand, speed and load monitoring and control system can be represented either by a stand alone system, a central facility or building control and monitoring system, or by an electrical utility power grid control and monitoring system or by a combination of the above systems. Either of these power demand monitoring and control system may be given an operational priority to control the electrical motor mode. For instance, power demand monitoring and control electrical utility grid system may be given operational priority over the stand alone or central facility or building power demand monitoring and control system, etc. These operational priorities are interchangeable and can be switched from one system priority to another system priority.

Developed optimized power demand control for electrical motors can be implemented by addition of the required means and new elements, as was described above, to the electrical motors variable frequency drive system with a bypass manufactured by many companies such as GE, etc. Similarly, multiple building automation systems can be utilized to function, as was described above, as an electrical motor power demand, speed and load monitoring and control system, for example, Andover building automation system, etc.

The preceding embodiment is representative of the invention. It is to be understood, however, that other expedients known to those skilled in the art or disclosed herein may be employed without departing from the spirit of the invention or the scope of the appended claims.

Having explained the invention what we claim is new is the following:

1. Electrical power energy conservation system comprising: single or multiple alternating current electrical motors serving pumps, fans, and various equipment and processes, that can be controlled by a variable frequency and speed drive mode or a constant frequency and speed drive mode; a motor drive is provided with a power demand control means for adjusting the frequency and the speed of the motor drive to follow the load variation so that power used by the motor is minimized; means to monitor and control the motor power demand and electrical usage at variable and constant frequency and speed modes; means to monitor and control the motor load at variable and constant frequency and speed modes; means to bypass variable and constant frequency and speed modes; means to monitor and control the periodicity and timing of switching the motor frequency and speed modes; means to determine the power demand operating point of equilibrium for the electrical motor mode switching control.

2. System according to claim 1 has means to control the electrical motor operation either via variable frequency and speed drive mode to vary the motor speed mode or via constant frequency and speed drive mode to maintain constant motor speed mode; the said variable frequency drive speed mode is activated via variable and constant frequency and speed drive bypass means, the said constant frequency drive speed mode is activated via constant and variable frequency and speed drive bypass means; the switching of the electrical motor from one operational mode to another is activated based on the criteria of equal power demands for the equal load conditions for the motor at variable and constant frequency and speed operational modes, the said conditions of equal power demands and loads for the electrical motor with variable and constant frequency and speed modes represent the power demand operating point of equilibrium for the motor, the said power demand operating point of equilibrium is determined based on the functional analysis of the system operational parameters, the said functional analysis is provided with the system power demand, motor speed and load monitoring means, the said system operational parameters are continually updated.

3. System according to claim 1 has means to determine the power demand operating point of equilibrium for the electrical motor, the said power demand operating point of equilibrium is used to switch the motor operation from one mode to another, if the power demand for the motor operation at variable frequency and speed drive mode is higher than the said power demand at operating point of equilibrium then the system should be switched to the motor constant frequency and speed drive mode, if the power demand for the motor operation at variable frequency and speed mode is equal or lower than the said power demand at operating point of equilibrium then the system should continue running in the variable frequency and speed drive mode, if the motor power demand for the motor operation at constant frequency and speed mode is lower than the said power demand at operating point of equilibrium then the system should be switched to the motor variable frequency and speed drive mode, if the power demand for the motor operation at constant frequency and speed mode is equal or higher than the said power demand at operating point of equilibrium then the system should continue running in the constant frequency and speed drive mode.

4. System according to claim 1 has predefined operational starting order that begins with variable frequency and speed drive control mode when the electrical motor first put in operation as soon as the said electrical motor reaches its predefined speed and upon the following up automatic switch from the variable frequency and speed drive mode to the constant frequency and speed drive mode the automatic sequential switching of frequency and speed modes control is activated for the said system, upon any interruption of the system normal operation the said system always will restart electrical motor operation in variable frequency and speed drive mode.

5. System according to claim 1 with a single or multiple electrical motors has means for a speed drive mode switching sequence that are controlled by a stand alone power demand and control system or by a central building, facility or electrical utility power demand and control system, the said power demand and control systems have means to limit the number of switching of the electrical motor operations between the constant and variable frequency and speed drive operational modes and to satisfy predefined switching time interval, the said power demand and control systems have means to be interconnected and to have variable operational priorities.

6. System according to claim 1 has means to monitor and display electrical motor power demand and energy usage during variable and constant frequency and speed drive modes, as well as motor historical trends of power demand operating point of equilibrium and power demand and electrical energy savings due to the optimized mode of operation of the said electrical motor with variable or constant frequency and speed drive modes over given time duration, the said system has means to select the order in which electrical motors are being switched from one operational speed mode to another, the said order is determined based on the magnitude of potential power demand and electrical energy usage reduction, the said electrical motors with higher potential power demand and electrical energy savings have a priority switching order over the said electrical motors with the lower power demand savings.

7. System according to claim 1 has means to determine, based on the actual load trend data, the required optimal design horsepower for the electrical motor and to compare the said optimal design horsepower with the installed electrical motor horsepower, the said means have the ability to recommend the said electrical motor horsepower change to further optimize the said electrical motor operation to match the actual electrical motor load and to reduce the motor power demand and electrical energy usage.

8. System according to claim 1 has means to realize power demand shedding strategy by switching the electrical motor mode of operation from variable frequency and speed mode to constant frequency and speed mode and from constant frequency and speed mode to variable frequency and speed mode, respectively, to reduce the electrical motor power demand instead of currently utilized power demand shedding strategy via tentative reduction in power supply to the electrical motor, the suggested power demand shedding strategy does not require a limitation in power supply to the said electrical motor and is adequate to satisfy the said electrical motor load.

* * * * *